T. S. Steadman.
Clover Harvester.
No. 2279 Reissued Jun. 5, 1866.
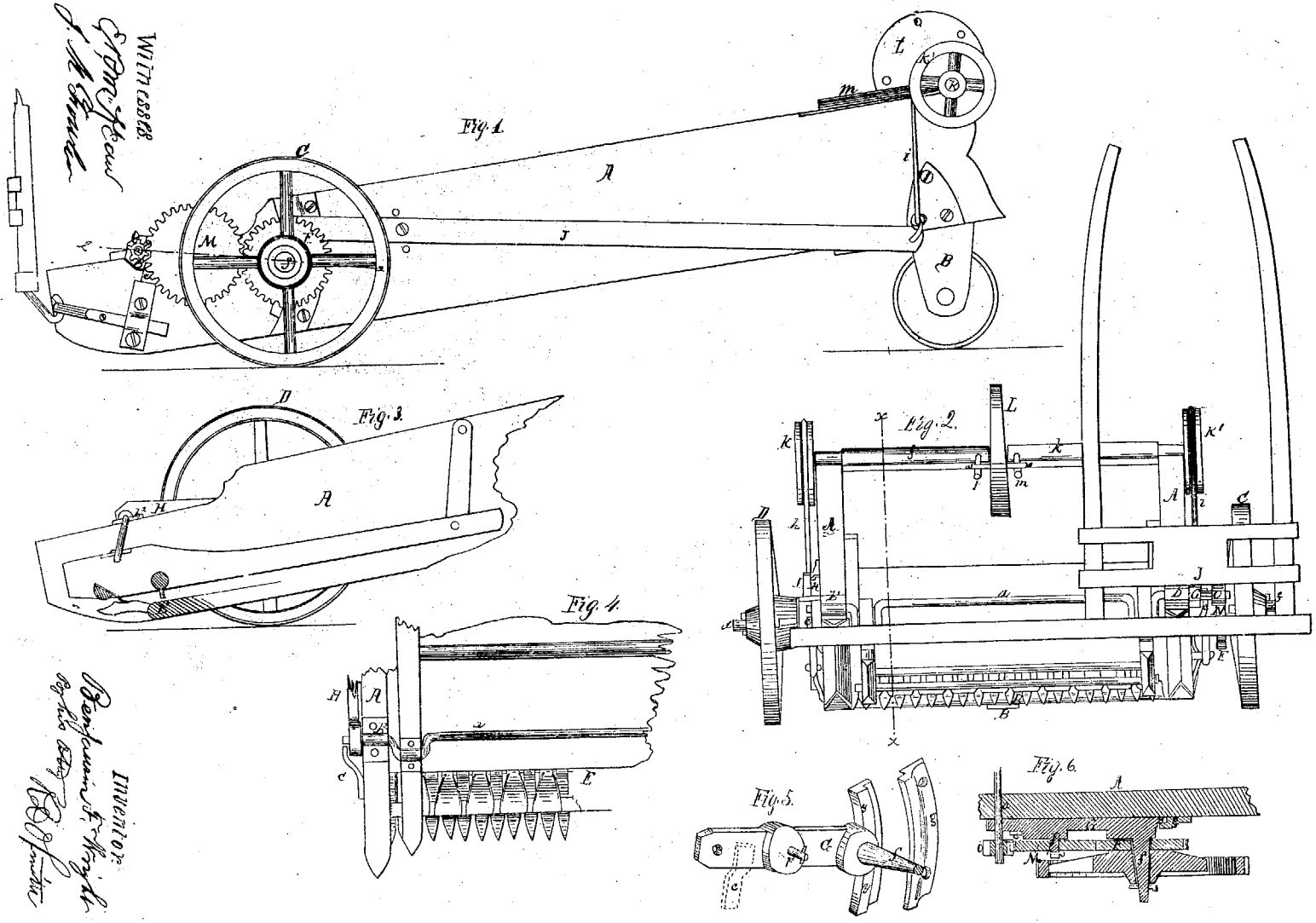
Witnesses.
E. M. Keas
J. M. Fowler
Inventor:
Benjamin F. Wright
By his Atty
R. D. Smith

UNITED STATES PATENT OFFICE.

BENJAMIN F. WRIGHT, OF SPRINGFIELD TOWNSHIP, CLARKE COUNTY, OHIO, ASSIGNEE, BY MESNE ASSIGNMENTS, OF THOS. S. STEADMAN.

IMPROVEMENT IN CLOVER AND GRASS SEED HARVESTERS.

Specification forming part of Letters Patent No. 10,967, dated May 23, 1854; Reissue No. 985, dated June 19, 1860; Reissue No. 2,279, dated June 5, 1866.

*To all whom it may concern:*

Be it known that THOMAS S. STEADMAN, of Murray, in the county of Orleans and State of New York, did invent new and useful Improvements in Clover and Grass Seed Harvesters; and I do hereby declare the following to be a full, clear, and exact description of the construction and operation of the same, as included in this patent, reference being had to the accompanying drawings, making a part of this specification, by figures and letters, in which—

Figure 1 is a side elevation of the machine. Fig. 2 is a front elevation of the same. Fig. 3 is a vertical longitudinal section on the line *x x*, Fig. 2, showing the construction and operation of the cutters and rake. Fig. 4 is a plan view of a part of the front end of the machine, showing the construction and operation of the cutters, fingers, &c. Fig. 5 is a perspective view of the axle-plate showing its construction and the guiding and retaining arc which holds the parts in place, detached. Fig. 6 is a horizontal section of a portion of the main frame and axle-plate on line *z z*, Fig. 1, with the parts attached thereto, showing their horizontal position and their relation and attachment to the main frame.

The nature of that part of the aforesaid invention embraced in this patent will be best understood by a reference to the following description and explanation.

That side of the machine, or side or end of its parts which is at the left hand when behind and facing the machine I call the inner side or end—as may be—and that or those at the right hand the outer side or end.

The same letter denotes the same part of the machine wherever it occurs in the drawings.

A is the main frame of the machine, ten feet long, five feet wide, and one and a half foot high at the sides, more or less.

*a* is the shaft of the cutters' driving pinion O, and is secured to the frame A by the boxes *b* and $b^2$ about at right angles to the line of its forward movement. Under and near the rear end of this frame is a caster-wheel, B, about one foot and a half in diameter, to enable the machine to be turned freely. Near the front end of the frame A, and at the sides thereof, are the wheels C and D, about three feet in diameter, which carry this end of the machine when the guard finger-bar E is not resting upon the ground. (See Figs. 1 and 3.) The carrying-wheel C is also the cutters' driving-wheel.

F is the cutters' driving cog-wheel, which is attached to the carrying-wheel C to transmit its rotary motion to the pinion O and shaft *a*.

The axle *f*, upon which the wheels C and F revolve, is formed on or rigidly attached to the axle-plate G, the form of which is shown by Figs. 5 and 6. This plate G is held substantially parallel with the main frame A, and so that the latter can be raised and lowered in respect to the axle *f* by the holding-plate *c* and the retaining and guiding arc *g*. The holding-plate *c* is securely attached to said frame A in such a position as to have one part resting against the inner side of the plate G farther forward than the axle *f*. The retaining and guiding arc *g* is securely bolted to the said frame in such a position that its concave edge shall be concentric to the axis of the shaft *a*, and also embrace and cover the convex portion *y* of the plate G. This axle-plate G and main frame A, by being thus connected, are so held together that this frame can be raised, lowered, or held at any desired height in respect to the axle *f* without essentially varying the distance between the axle *f* and shaft *a* or their parallelism, and without being separated during the operation of raising or lowering, and thus differs from all the harvesters which existed previous to the aforesaid invention, having the axle of the cutters' driving-wheel rigidly attached by one end only, confined to the side of the frame, without having any part of said axle crossing a vertical plane parallel with the side of the frame nearest to it.

The intermediate wheel M on the axle *p* is inserted between the driving cog-wheel F and pinion O, to give the cutters their proper backward motion when this driver F has its cogs on the outside. It will therefore be obvious that the presence or absence of this intermediate wheel M has nothing to do with the function of this plate G and its holding mechanism.

The intermediate wheel M is removed from its place when it is desired to stop the cutters' motion, and in this respect it may be said to serve the office of an unshipping mechanism for the cutters.

The main advantage gained by having the axle of the cutters' driving-wheel, while entirely at one side of the main frame, thus connected thereto is that the main frame is always held to the axle of its supporting-wheel, instead of having to be entirely separated while being raised or lowered in respect to this axle, and so that the attendant can make this change without the assistance of any other person by the aid of the hereinafter-described mechanism therefor, while the previous manner of bolting this axle-plate directly to the side of the frame in such position as would hold it at the desired height required the joint action of two or more men for a considerable length of time to make any change of said height, besides causing much wear and liability to derangement and breakage in the variable parts.

The axle *d* of the supporting-wheel D is connected to the outer side of the main frame A by an axle-plate H, which is constructed, hung, and retained in a manner similar to the plate G, except no provision is made for an intermediate wheel.

I and J are the levers by means of which the attendant of the machine, whether riding on it or not, raises the cutting apparatus from the ground, on which it runs when not supported by these levers. They are pivoted to the frame A near their forward ends, and extend from the hubs at the bases of the axles *f* and *d* backward nearly or quite to the rear end of the machine. The forward ends of the levers I and J rest upon the hubs at the rear ends of the coupling-arms G and H, and to their rear ends are attached the cords *h* and *i*, which pass thence upward and around the pulleys *k* and *k'* on the outer ends of the windlass-shafts *j* and *k*, which are operated by the hand-levers *l* and *m*. The two shafts *j* and *k* have their inner bearings in the plate L, and they are retained in any desired position by putting the pins *u* and *o* into proper holes through the plate L, so that the hand-levers *l* and *m* will strike against and be stopped by the said pins.

What I claim under this patent as the invention of THOS. S. STEADMAN, and desire to secure by Letters Patent, is—

1. In combination with the main frame of a harvester, an axle upon which the cutters' driving-wheel revolves, that derives all its connection with the frame through one end, and which end does not cross a vertical plane parallel with and touching the side of this frame nearest to it, a plate from which this axle projects, and a holding mechanism that holds this plate and frame together and prevents any essential variation in the distance between this axle and the cutters' driving-pinion shaft or in their parallelism while the frame is being raised or lowered in respect to this axle, substantially as and for the purpose set forth.

2. In combination with the main frame of a harvester, an axle upon which the cutters' driving-wheel revolves, that derives all its connection with the main frame through one end, and which end does not cross a vertical plane parallel with and touching that side of this frame nearest to it, and a plate from which this axle projects, a holding mechanism that prevents any essential variation in the distance between this axle and the cutters' driving-pinion shaft or of their parallelism while the main frame is being raised or lowered in respect to this axle, and another holding mechanism by which the attendant is enabled to have this main frame held at different heights in respect to this axle, substantially as and for the purpose set forth.

3. In combination with the main frame of a harvester, an axle-plate which is connected with one end of the axle of the cutters' driving-wheel, said plate being wholly between the plane of said wheel and a plane parallel with and touching that part of said frame nearest to said wheel, a holding mechanism which prevents any movement of this plate other than its movement in the arc of a circle concentric to the axis of the shaft of the cutters' driving-pinion, and a holding mechanism having one portion farther forward than the axle of the cutters' driving-wheel and another portion farther back than said axle, between each of which and the frame is a portion of said plate, and by which said plate is held to the frame while it is being raised or lowered in respect to said axle, substantially as and for the purpose set forth.

In witness whereof I hereunto sign my name.

BENJAMIN F. WRIGHT.

In presence of—

S. D. CARPENTER,

J. WARREN KEIFER.